(12) United States Patent
Achepohl

(10) Patent No.: US 6,560,912 B1
(45) Date of Patent: May 13, 2003

(54) HUNTING DECOY

(76) Inventor: Gary R. Achepohl, Elmhurst, IL (US)

( * ) Notice: Subject to any disclaimer, the term of this patent is extended or adjusted under 35 U.S.C. 154(b) by 0 days.

(21) Appl. No.: 10/015,867

(22) Filed: Dec. 12, 2001

(51) Int. Cl.[7] .................................................. A01M 31/06
(52) U.S. Cl. ........................................................... 43/3
(58) Field of Search ......................................... 43/2, 3

(56) References Cited

U.S. PATENT DOCUMENTS

| | | | | |
|---|---|---|---|---|
| 231,906 A | * | 9/1880 | Gladwish | 43/3 |
| 410,523 A | * | 9/1889 | Jencks | 43/3 |
| 717,790 A | * | 1/1903 | Yorke | 43/3 |
| 1,468,979 A | * | 9/1923 | Sherman et al. | 43/3 |
| 1,486,329 A | * | 3/1924 | George | 43/3 |
| 1,571,213 A | * | 2/1926 | Pitts | 43/3 |
| 1,608,045 A | * | 11/1926 | Stallman | 43/3 |
| 1,616,006 A | * | 2/1927 | Sinibaldi | 43/3 |
| 1,708,762 A | * | 4/1929 | Hudson | 43/3 |
| 1,813,370 A | * | 7/1931 | Villatore et al. | 43/3 |
| 1,923,442 A | * | 8/1933 | Kilgore | 43/3 |
| 2,162,786 A | * | 6/1939 | Oeding | 43/3 |
| 2,185,013 A | * | 12/1939 | Bonetti | 43/3 |
| 2,196,078 A | * | 4/1940 | Pearce | 43/3 |
| 2,201,164 A | * | 5/1940 | Fox | 43/3 |
| 2,237,194 A | * | 4/1941 | Ohnmacht | 43/3 |
| 2,267,357 A | * | 12/1941 | Soule | 43/3 |
| 2,391,475 A | * | 12/1945 | Newhardt | 43/3 |
| 2,430,645 A | * | 11/1947 | Mills et al. | 43/3 |
| 2,460,128 A | * | 1/1949 | Greenleaf | 43/3 |
| 2,651,873 A | * | 9/1953 | Risch et al. | 43/3 |
| 2,719,376 A | * | 10/1955 | Risch | 43/3 |
| 3,059,368 A | * | 10/1962 | Wortman | 43/3 |
| 3,408,763 A | * | 11/1968 | Rudolph | 43/3 |
| 4,852,288 A | | 8/1989 | Payne et al. | 43/2 |
| 4,885,861 A | | 12/1989 | Gazalski | 43/3 |
| 4,896,448 A | | 1/1990 | Jackson | 43/3 |
| 4,972,620 A | | 11/1990 | Boler | 43/3 |
| 5,003,718 A | | 4/1991 | Lenert et al. | 43/3 |
| 5,036,614 A | | 8/1991 | Jackson | 43/3 |
| 5,199,204 A | | 4/1993 | Lowery | 43/2 |
| 5,231,780 A | | 8/1993 | Gazalski | 43/3 |
| 5,274,942 A | | 1/1994 | Lanius | 43/2 |
| 5,289,654 A | | 3/1994 | Denny et al. | 43/2 |
| 5,375,363 A | | 12/1994 | Higdon | 43/3 |
| 5,377,439 A | | 1/1995 | Roos et al. | 43/3 |
| 5,964,055 A | | 10/1999 | Smith | 43/3 |
| 6,339,895 B1 | * | 1/2002 | Lawson | 43/3 |

* cited by examiner

Primary Examiner—Darren W. Ark

(57) ABSTRACT

A hunting decoy has a movable head assembly, removably mounted on a hollow body. The head can move within a relationship to the body, in order to provide a more realistic decoy. A weight may be secured to a base of the head assembly to assist the movement, when the head assembly is mounted within the body.

2 Claims, 6 Drawing Sheets

HUNTING DECOY

This invention relates to a hunting decoy, and more particularly to a hunting decoy having a body and a separable head with the head being movable when mounted in the body.

BACKGROUND OF THE INVENTION

In hunting, especially for water fowl, it is customary to use at least one decoy, and disperse any available decoy on water. As the decoy increases in its quality of a realistic appearance, greater effectiveness of the decoy is achieved. Clearly, the purpose of the decoy is to attract water fowl to a desired area. With the decoys being more realistic, the decoys will be more effective in attracting the desired water fowl.

Typically, geese and ducks are hunted during a designated hunting season. The hunter will go to a water area, in which, water fowl are known to congregate. To assist in attracting geese or ducks or other water fowl to the area, the decoys resembling those birds are placed on the water.

It is now known that the more realistic decoys attract more birds. Many attempts are known to make the decoys more realistic. A key factor, for increasing the realism of the decoy, is providing movement to the decoy.

Such movement must be accomplished and about the reasonable fashion without making deployment of the decoy more difficult. Yet movement inherently implies a mechanism, which leads to complexity of the decoy. As complexity of the decoy increases, a decline in ease of transportation of the decoys, dispersal of the decoys for hunting and retrieval of the decoys for the homeward-bound trip.

Typically, movement for a decoy is accomplished by a mechanical or electrical device. Such devices add greatly to the complication of the decoy. Also, the electronics or mechanics, used to achieve the movement, require the use of grease, batteries, or other materials, which can have a polluting function. It is very desirable to avoid these problems.

It is very desirable to achieve the desired movement in the decoy, with a minimal increase in complexity for the decoy structure. Such a structure, while being desirable, is difficult to obtain.

SUMMARY OF THE INVENTION

Among the many objectives of this invention is the provision of a hunting decoy with a movable head.

A further objective of this invention is the provision of a hunting decoy, which is easily dispersed for hunting.

Yet a further objective of this invention is the provision of a hunting decoy to attract water fowl.

A still further objective of this invention is the provision of a hunting decoy which is easily transported.

Another objective of this invention is the provision of a hunting decoy, which is easily retrieved.

Yet another objective of this invention is the provision of a hunting decoy, which has a moving part.

Still, another objective of this invention is the provision of a hunting decoy, with a simplified moving part.

Also, an objective of this invention is the provision of a hunting decoy, which is transportable.

A further objective of this invention is the provision of a hunting decoy, which avoids mechanical movement.

Yet a further objective of this invention is the provision of a hunting decoy, which avoid electrical movement.

A still further objective of this invention is the provision of a hunting decoy, which minimizes pollution.

These and other objectives of the invention (which other objectives become clear by consideration of the specification, claims and drawings as a whole) are met by providing a hunting decoy, having a body and a separable head with the head being movable when mounted in the body and positioned by a weight.

BRIEF DESCRIPTION OF THE DRAWINGS

Throughout the figures of the drawings, where the same part appears in more than one figure of the drawings, the same number is applied thereto.

PREFERRED EMBODIMENTS

Figure 1:
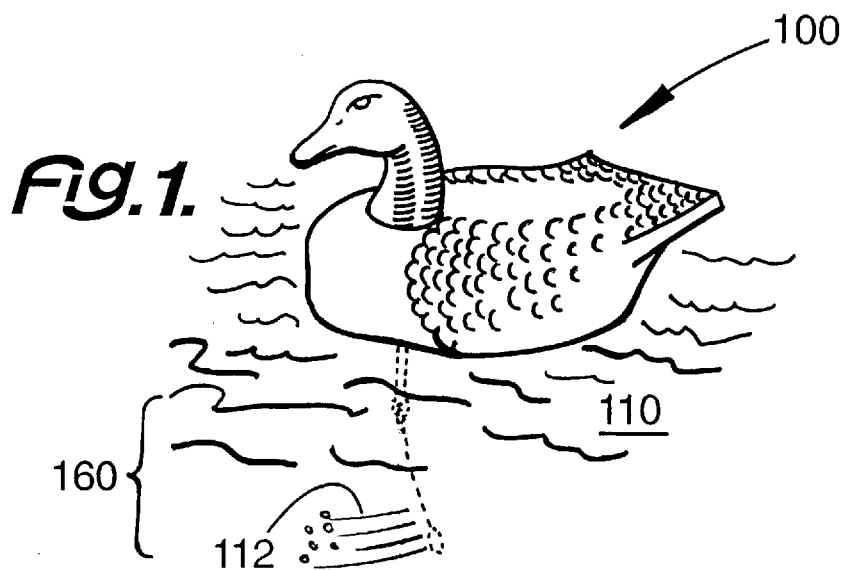
FIG. 1 depicts a perspective view of the hunting decoy 100 of this invention in use.

With a decoy of this invention, a body supports a movable head assembly, in order to form the decoy. More particularly, the decoy has a hollow body. The interior of the body is adapted to be adjacent to the water in the decoy is in use. Thus, the concave or hollow interior of the decoy body has an edge. The exterior of the body contains an appropriate decoration to mimic the body of a waterfowl, such as a duck or goose. Within the body, a top or an exterior portion thereof and at one end thereof is a receiver for the head assembly.

The head assembly includes a top head shaped portion adapted to appear on the top of the body. Attached to the head shaped portion is a mounting base. Attached to the mounting base is a weight assembly. The mounting base and head shaped portion fit into the receiver. Water movement causes the weight assembly and hence the mounting base to move. This movement is transferred to the top head shaped portion and provides the lifelike appearance for the decoy.

The receiver and the mounting base are adapted to work together and permit the weight assembly to move the head. One preferred form of the receiver is a circular aperture, which receives a mounting base in the shaped of a round rod or a pendulum. As the head shaped portion rests in the circular aperture, movement is provided by a current moving the weight and hence the head.

Another preferred form of the receiver is a slot. Typically, the round rod is replaced in this case with a rocking pivot or rocking plate. Also, at the end of the rocking pivot, a weight may be secured thereto and provide for movement of this head also.

With the hollow body and the removable head, ease of transportation is provided in that the head shaped member may be removed from the body and easily stored within the hollow interior along with the weight assembly. Such a simple structure also provides for ease of assembly at the hunting site, and ease of disassembly for storage and transportation.

Clearly the head shaped portion and the body are colored appropriately to resemble any waterfowl being sought or hunted. Furthermore, the appropriate size and shape of both the body and head can be made to resemble any fowl, depending on the fowl being sought, or hunted. It is clear that the hollow structure of the body and the movability of the head combine to provide great flexibility in the decoy use or permit a wide variety of applications.

As is well known by most hunters, the position of the head of a waterfowl has various means. While many positions are known to be indicated by the head position, it thus becomes clear that the head of the decoy of this invention can be adapted to show those positions and make a decoy more attractive to a waterfowl. Typically, a head position can show attitude, swimming, or feeding. With the head appropriately shaped, the decoy can mimic these desired positions.

These decoys may be formed from any suitable material. The main requirement for material is that it floats on water, receives appropriate decoy colors, and provides an appropriate decoy shape. Thus, the decoys can be made from wood, synthetic resin or plastic, or combinations thereof. The resin or plastic may be solid or foamed.

Referring now to FIG. 1, hunting decoy 100 is positioned on a body of water 110. The hunting decoy 100 may be used alone or in combination with other decoys 100. These other decoys 100 may be of the same type or a different type as desired. Decoy 100 may be shaped to correspond to a desired waterfowl and does have a movable head, based on the particular structure and activated at least in part by weight assembly 160, which results in movement of water 112 in body of water 110.

Figure 2:
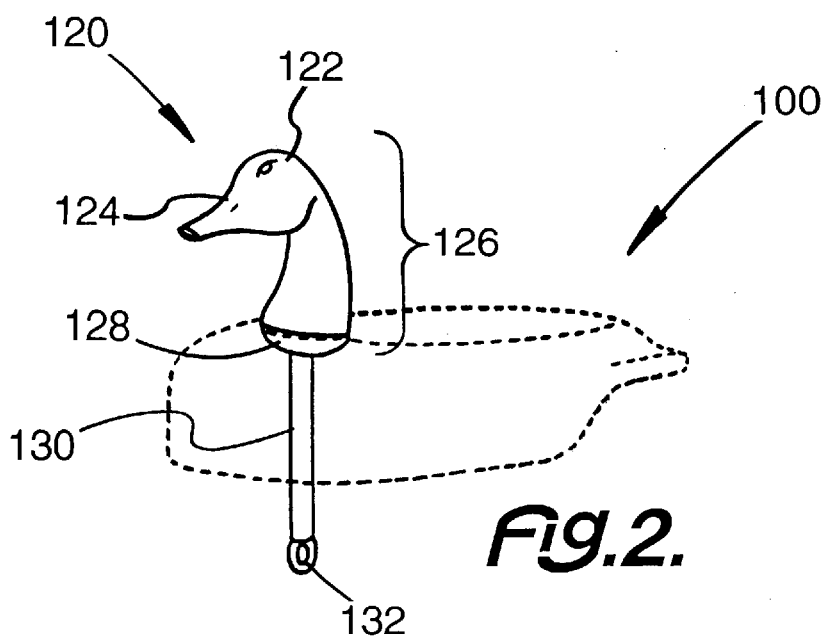
FIG. 2 depicts a perspective view of hunting decoy 100 of this invention showing a rounded head mount 120.

Adding FIG. 2 to the discussion, the rounded head mount 120 has a structure for hunting decoy 100, which becomes clear. The rounded head mount 120 includes the head shaped member 122 preferably with the mouth portion or bill 124 extending from a top portion 126 thereof. Oppositely disposed from the bill 124 is rounded base 128 of head shaped member 122.

Extending from the rounded base 128 of other head shaped member 122 and a mounting rod 130. The mounting rod 130 has an eyelet 132 at an end thereof, which is oppositely disposed from bill 124 and rounded base 128.

Figure 3:
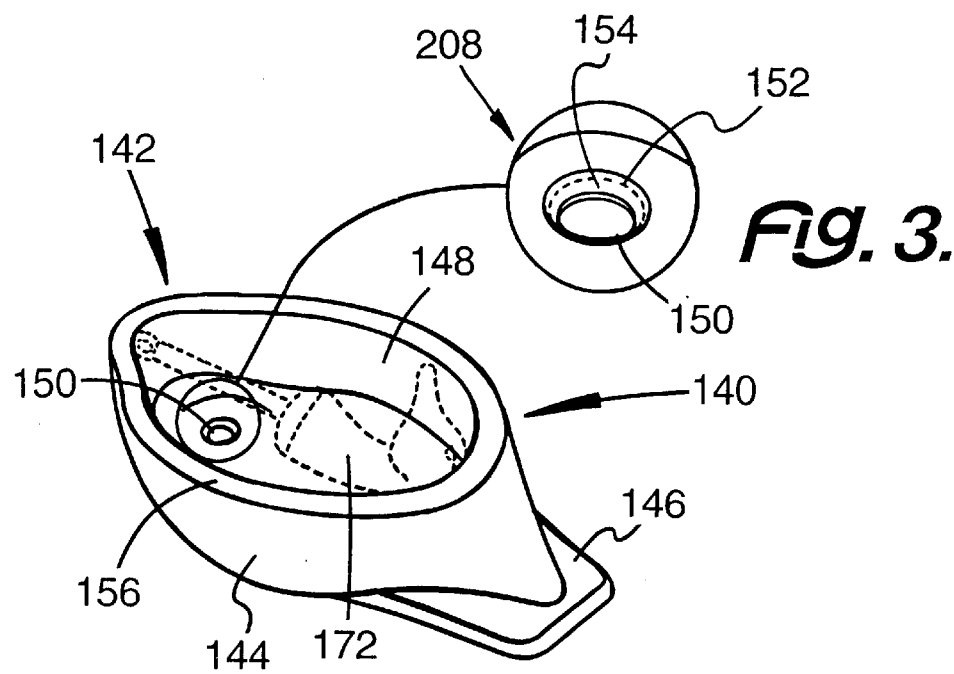
FIG. 3 depicts a perspective view of a rounded body mount 140 for the hunting decoy 100.

Adding FIG. 3 to the consideration, the rounded body 140 from the bottom view 142 depicts a main section 144 with tail section 146 extending therefrom. With the bottom view 142, it can be seen that body 140 has a concave or hollow portion 148. Oppositely disposed from tail section 146 is a circular aperture 150. Hollow portion 148 terminates at edge 152.

Figure 4:
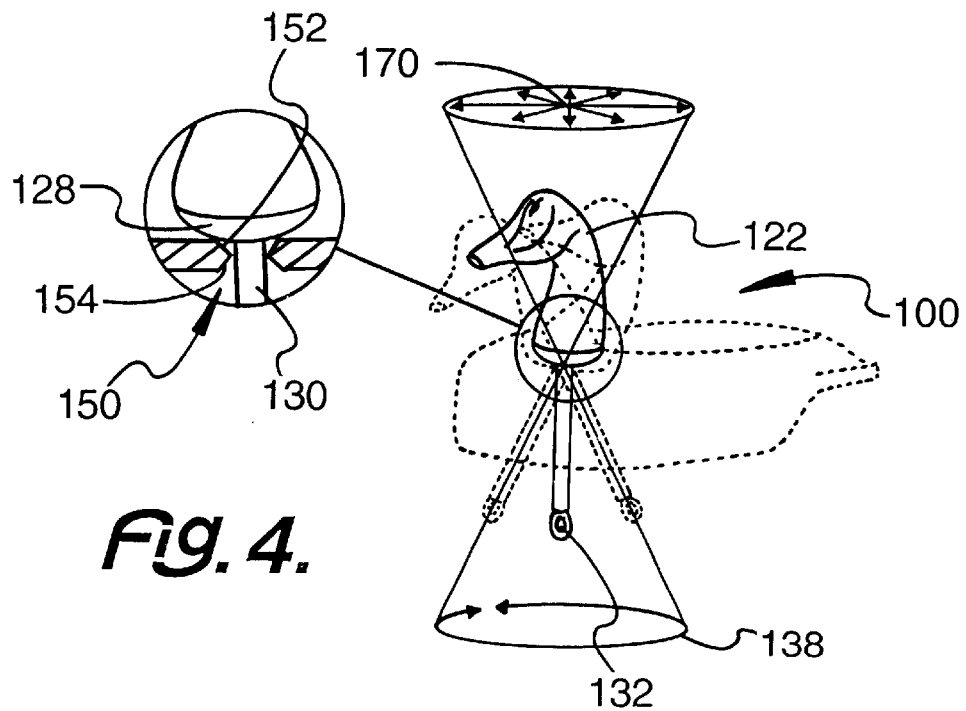
FIG. 4 depicts a perspective view of hunting decoy 100 of this invention showing a rounded head mount 120 with a generally circular movement arc 138.

With the further consideration of FIG. 4, it becomes clear that rounded base 128 fits into circular aperture 150. Circular aperture 150 has a beveled edge 152, which receives rounded base 128 and permits mounting rod 130 to pass therethrough. Through eyelet 132 (FIG. 5 and FIG. 6) may be secured to a weight assembly 160. As the water 112 in the body of water 110 moves due to wind or other activity weight assembly 160 moves, thereby moving head shaped member 122. Such movement of head shaped member 122, shown by circular arrows 170 showing a rocking movement in any directions of a combined 360 degree radius, thereby providing a general circular movement of arc 138 and adding at least one degree realism to the hunting decoy 100.

More particularly, with rounded base 128 resting on beveled edge 152 of circular aperture 150, a natural range of motion into a circular plane shown by generally circular movement arc 138 is achieved. Circular beveled edge 152 includes a circular bottom taper 154 within the hollow portion 148, circular top taper is oppositely disposed therefrom.

Figure 7:
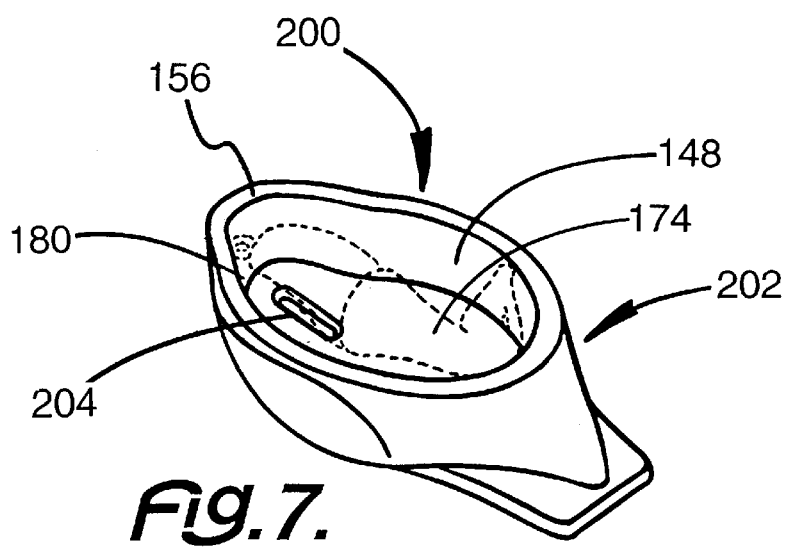
FIG. 7 depicts a perspective view of hunting decoy 100 of this invention showing a slotted body 202.
Figure 8:
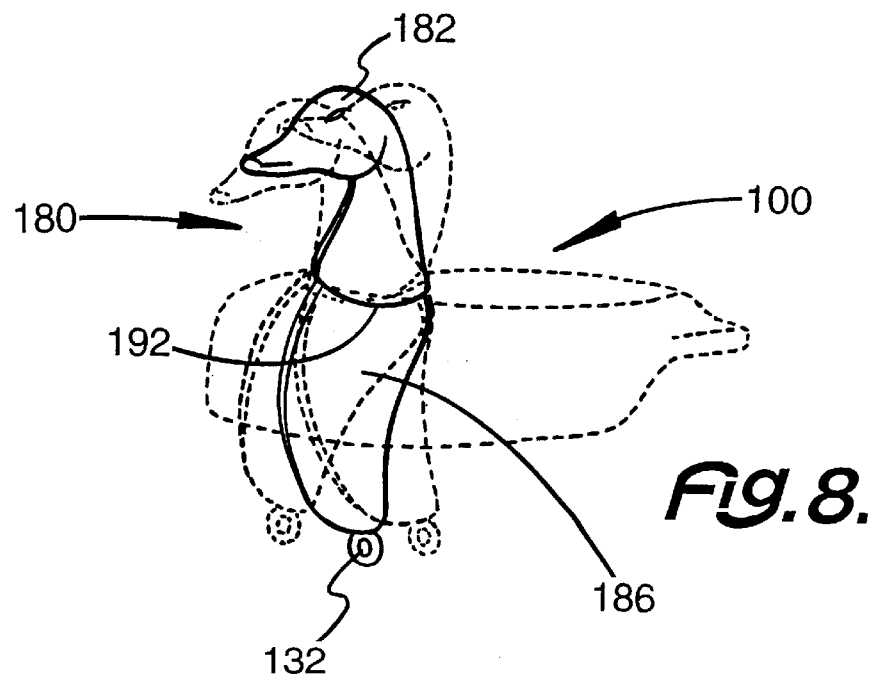
FIG. 8 depicts a perspective view of hunting decoy 100 of this invention showing a rocking head mount 180.

Side to side movement arc 188 is indicated by side arrows 210 in FIG. 7 and FIG. 8, and is facilitated by cradle slot 204 having beveled cradle sides 208, which permits side to side movement of rocking plate 186. Also, movement of head shaped portion 182 on flat head mount 180 toward tail section 146 and away therefrom is facilitated by beveled sides 208.

More particularly, beveled cradle sides 208 have slotted bottom taper in-hollow portion 148, with slotted top taper oppositely disposed therefrom in cradle slot 204. Clearly, this structure for beveled cradle sides 208 permits flat head mount 180 and hence head shaped portion 182 movement within cradle slot 204. Rocking plate 186 also permits the head shaped portion 182 to face front; or be removed from cradle slot 204, rotated 180 degrees about a vertical axis, and reinserted in the cradle slot 204 in order to face the tail section 146, when desired.

Figure 11:
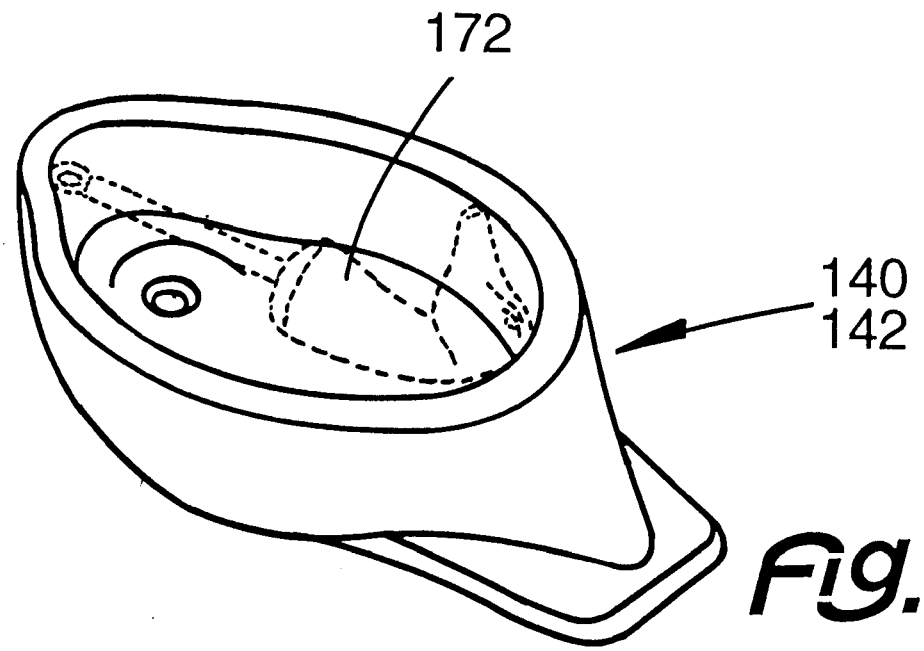
FIG. 11 depicts a perspective view of hunting decoy 100 of this invention showing round stored position 172.
Figure 12:
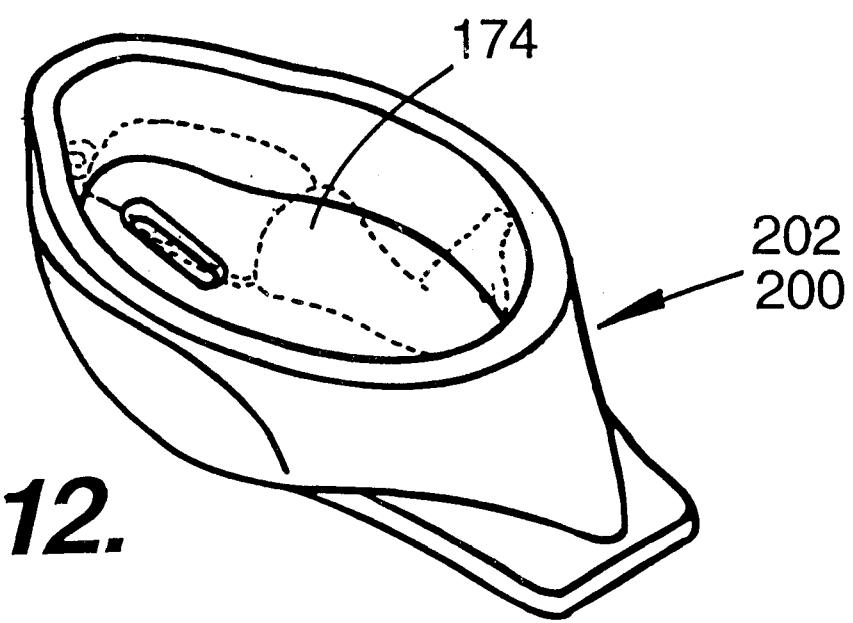
FIG. 12 depicts a perspective view of hunting decoy 100 of this invention showing rocking stored position 174.

Slotted body also includes hollow portion 148, terminates at edge 152. Clearly either head shaped portion 182 or head shaped member 122 may be in rocking stored position 174 within slotted body 202 (shown in phantom in FIG. 12), or in round stored position 172 within rounded body 140 (shown in phantom in FIG. 11), for transport to or from a hunting site.

Figure 5:
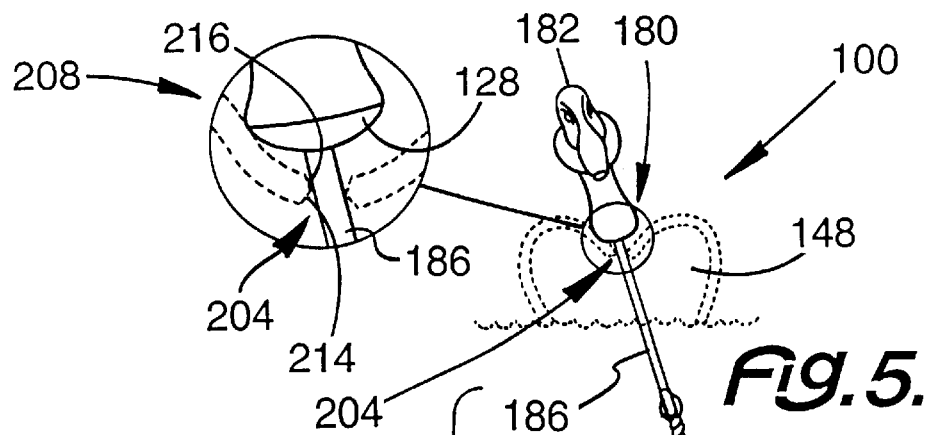
FIG. 5 depicts a perspective view of hunting decoy 100 of this invention showing a slotted body 202 with a first movement, which is a generally side movement arc 188 in a first direction.
Figure 6:
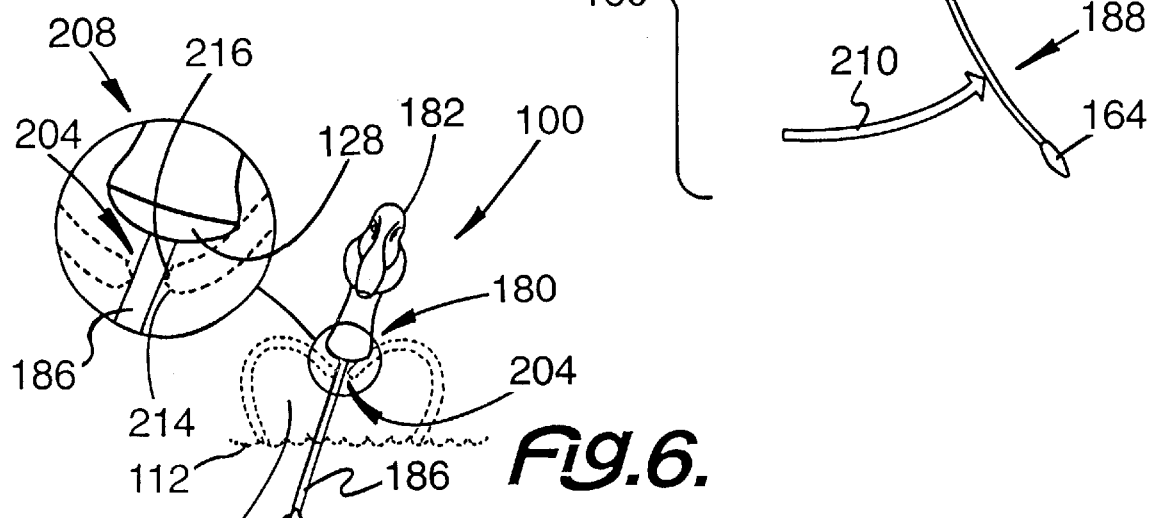
FIG. 6 depicts a perspective view of hunting decoy 100 of this invention showing a slotted body 202 with a second movement, which is a generally side movement arc 188 in a second direction.

Movement indicated by either side arrows 210 of rocking plate 186 in FIG. 5 and FIG. 6, or by circular arrows 170 of FIG. 4 is postulated to occur due to either wind action on the head shaped portion 182 or head shaped member 122; or current action on the weight assembly 160; or even combinations thereof. While other postulates may explain the movement of either head shaped portion 182 or head shaped member 122, the defined postulate is believed to be the most likely explanation of head movement for decoy 100.

Also in FIG. 5 and FIG. 6, movement line 166 can be attached to weight assembly 160 and the hunting decoy 100 moved thereby. Movement line 166 is generally a substantially invisible fishing line, which reaches a hunter, (not shown) and permits a remote repositioning of the decoy 100. Of course, movement line 166 may be attached in any suitable to any suitable place. But tying to weight assembly 160 is preferred.

Adding FIG. 7 to the discussion of FIG. 5, a bottom view 200 of slotted body 202 is depicted. Within slotted body 202 is cradle slot 204. The cradle slot 204 has straight cradle sides 206 and receives rocking plate 186. Because rocking plate 186 can move within cradle slot 204, head shaped portion 182 can move backward and forward, thereby adding to the usefulness of the hunting decoy 100.

While FIG. 8 is similar to FIG. 2, rounded head mount 120 of FIG. 2 is replaced with rocking head mount 180 of FIG. 5. Rocking head mount 180 includes a head shaped portion 182 with rocking mounting plate 184 extending therefrom. Head shaped portion 182 is similar in appearance to head shape member 122 in that it may be adapted to various types of waterfowls. However, rocking plate 186 extends therefrom as a replacement for mounting rod 130 (FIG. 2).

Figure 9:
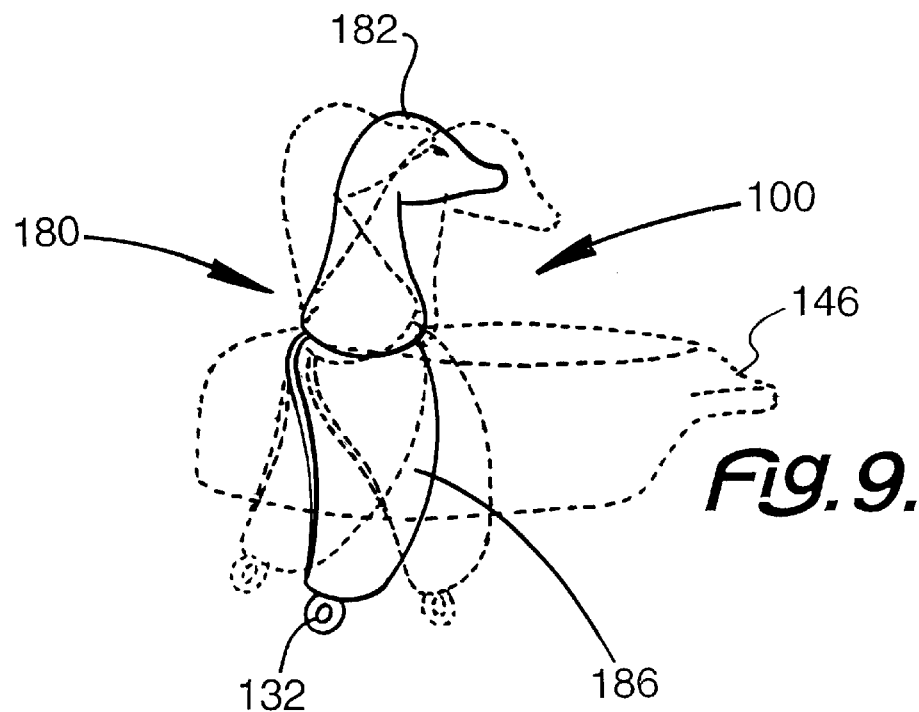
FIG. 9 depicts a perspective view of hunting decoy 100 of this invention showing a rocking head mount 180 facing tail section 146, as a reverse facing of FIG. 8.

When FIG. 9 is considered therewith, it is clear that side movement arc 188 of FIG. 5 and FIG. 6 is restricted or eliminated due to the absence of beveled sides 208. Further, head shaped portion 182 may face tail section 146 by removing rocking head mount 180, rotating the same 180 degrees and reinserting the same.

In the preferred embodiment shown for rocking plate 186, arcuate base 192 is present at a base of head shaped portion 182 and substantially perpendicularly adjacent to rocking plate 186. In this fashion head shaped portion 182 substantially only rocks back and forth toward and away from tail section 146

Likewise rocking plate 186 has an eyelet 132 extending therefrom. The weight assembly 160 is mountable therein. Weight assembly 160 may have any suitable structure. In a preferred form, a flexible member 162, such as a string, may be secured at one end to eyelet 132 by tying, splicing or other suitable device or method. At the other end of flexible member 162 is secured a solid weight 164 in a fashion similar to that of eyelet 132. Weight 164 provides stability to the decoy 100, while in use or storage.

Figure 10:
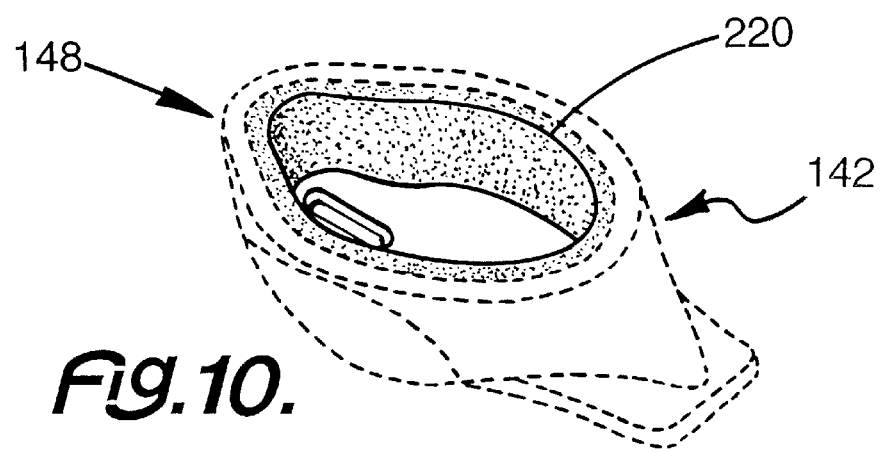
FIG. 10 depicts a perspective view of a foam lining 210 for hunting decoy 100 of this invention.

With the addition FIG. 10, the foam lining 210 and buoyancy to the decoy 100. In this fashion, materials having a greater density than water may be used on the decoy 100, provided a sufficient foam lining 220 is provided in hollow portion 148 to add the proper buoyancy.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A hunting decoy having a body and a head assembly mounted in the body comprising:

(a) the body receiving the head assembly;
   (b) the head assembly having at least one arc movement relative to the body when the body receives the head assembly;
   (c) the body having an interior and an exterior;
   (d) the exterior having a decoration in order to mimic an appearance of a waterfowl;
   (e) the at least one arc movement serving to mimic a movement of a waterfowl;
   (f) the interior of the body being adapted to be adjacent to water when the hunting decoy is in use;
   (g) the interior having a base edge;
   (h) the base edge being adapted to contact water when the hunting decoy is in use;
   (i) the body including a receiver for the head assembly;
   (j) the head assembly including a top head shaped portion and a mounting base;
   (k) the mounting base fitting in the receiver;
   (l) the head shaped portion being movable relatively to the body;
   (m) the mounting base having a weight assembly secured thereto;
   (n) the weight assembly providing stability to the hunting decoy and assisting the at least one arc movement of the head assembly;
   (o) the top head shaped portion appearing on the exterior;
   (p) the top head shaped portion providing an attitude for the hunting decoy;
   (q) the interior of the body being hollow;
   (r) the mounting base being a rod;
   (s) the receiver and the mounting base being adapted to work together and permit the head assembly to move;
   (t) the receiver being a circular aperture;
   (u) the top head shaped portion having a bill extending therefrom;
   (v) a rounded base being between the top head shaped portion and the mounting rod;
   (w) the circular aperture having a beveled edge;
   (x) the beveled edge being adapted to receive the rounded base;
   (y) the mounting rod having an eyelet at an end thereof with the eyelet being oppositely disposed from the rounded base; and
   (z) the eyelet receiving a weight of the weight assembly.

2. A hunting decoy having a body and a head assembly mounted in the body comprising:

the body receiving the head assembly;
   the head assembly having at least one arc movement relative to the body when the body receives the head assembly;
   the body having an interior and an exterior;
   the exterior having a decoration in order to mimic an appearance of a waterfowl;
   the at least one arc movement serving to mimic a movement of a waterfowl;
   the interior of the body being adapted to be adjacent to water when the hunting decoy is in use;
   the interior having a base edge;
   the base edge being adapted to contact water when the hunting decoy is in use;
   the body including a receiver for the head assembly;
   the receiver for the head assembly being selected from the group consisting of a circular aperture and a cradle slot;
   the head assembly including a top head shaped portion and a mounting base;
   the mounting base fitting in the receiver;
   the head shaped portion being movable relatively to the body;

the mounting base having a weight assembly secured thereto;

the weight assembly providing stability to the hunting decoy and assisting the at least one arc movement of the head assembly;

the top head shaped portion appearing on the exterior;

the top head shaped portion providing an attitude for the hunting decoy;

the interior of the body being a hollow body;

the head assembly being easily inserted into the body;

the head assembly being easily removed from the body;

the head assembly being easily transported or stored within the hollow body;

the mounting base being a rod;

the receiver and the mounting base being adapted to work together and permit the head assembly to move;

the receiver being a circular aperture;

the top head shaped portion having a bill extending therefrom;

a rounded base being between the top head shaped portion and the mounting rod;

the circular aperture having a beveled edge;

the beveled edge being adapted to receive the rounded base;

the mounting rod having an eyelet at an end thereof;

the eyelet being oppositely disposed from the rounded base; and the eyelet receiving a weight of the weight assembly.

* * * * *